US009696545B2

(12) United States Patent
Kobayashi

(10) Patent No.: US 9,696,545 B2
(45) Date of Patent: Jul. 4, 2017

(54) PROJECTOR HAVING HOLDERS ARRANGED IN A LIGHT EMITTING DIRECTION

(71) Applicant: Funai Electric Co., Ltd., Osaka (JP)

(72) Inventor: Tomohiro Kobayashi, Shijyonawate (JP)

(73) Assignee: Funai Electric Co., Ltd., Osaka (JP)

( * ) Notice: Subject to any disclaimer, the term of this patent is extended or adjusted under 35 U.S.C. 154(b) by 23 days.

(21) Appl. No.: 14/796,517

(22) Filed: Jul. 10, 2015

(65) Prior Publication Data

US 2016/0011416 A1    Jan. 14, 2016

(30) Foreign Application Priority Data

Jul. 11, 2014   (JP) ................. 2014-143395

(51) Int. Cl.
*G03B 21/20* (2006.01)
*G02B 27/01* (2006.01)
*G02B 26/10* (2006.01)
*H04N 9/31* (2006.01)
*B29C 65/00* (2006.01)
*B29C 65/16* (2006.01)
*B29L 11/00* (2006.01)

(52) U.S. Cl.
CPC ...... *G02B 27/0149* (2013.01); *B29C 65/1638* (2013.01); *B29C 66/1122* (2013.01); *B29C 66/54* (2013.01); *B29C 66/8122* (2013.01); *B29C 66/81267* (2013.01); *G02B 26/10* (2013.01); *G02B 27/01* (2013.01); *G03B 21/20* (2013.01); *G03B 21/2033* (2013.01); *H04N 9/315* (2013.01); *H04N 9/3129* (2013.01); *B29C 65/1616* (2013.01); *B29C 65/1677* (2013.01); *B29C 66/71* (2013.01); *B29C 66/8322* (2013.01); *B29L 2011/00* (2013.01); *G02B 2027/0161* (2013.01)

(58) Field of Classification Search
CPC ...... G03B 21/20; G03B 21/2033; G02B 6/32; G02B 6/4238; G02B 6/4239; G02B 6/4257
See application file for complete search history.

(56) References Cited

U.S. PATENT DOCUMENTS

| 5,497,366 A | * | 3/1996 | Fujisawa | G11B 7/22 369/112.24 |
| 2005/0057643 A1 | * | 3/2005 | Okazaki | B41J 2/45 347/242 |
| 2011/0013869 A1 | * | 1/2011 | Pezeshki | G02B 6/32 385/33 |
| 2011/0102747 A1 | * | 5/2011 | Lee | H04N 9/3129 353/31 |

(Continued)

FOREIGN PATENT DOCUMENTS

JP    H05-323166 A    12/1993

*Primary Examiner* — Sultan Chowdhury
(74) *Attorney, Agent, or Firm* — Osha Liang LLP

(57) ABSTRACT

A projector includes a light source portion; and an optical scanning portion that scans light from the light source portion, wherein the light source portion comprises a first holder that holds a light source, and a second holder that holds an optical portion through which light from the light source is emitted, and the first holder and the second holder are arranged in that order from a light emitting direction.

17 Claims, 11 Drawing Sheets

(56) References Cited

U.S. PATENT DOCUMENTS

| | | | | |
|---|---|---|---|---|
| 2012/0002263 A1* | 1/2012 | Furuya | ................... | G03B 21/28 |
| | | | | 359/238 |
| 2012/0307212 A1* | 12/2012 | Enomoto | ............... | G03B 21/16 |
| | | | | 353/52 |
| 2014/0016106 A1* | 1/2014 | Lin | ........................ | F21V 14/02 |
| | | | | 353/87 |

\* cited by examiner

PROJECTOR HAVING HOLDERS ARRANGED IN A LIGHT EMITTING DIRECTION

TECHNICAL FIELD

This invention relates to a projector and head up display device, and more particularly to a projector and head up display device provided with a light source holding portion and an optical system holding portion.

BACKGROUND ART

A conventional optical path adjusting device for a magneto-optical disk device provided with an optical system holding portion and a light source holding portion is known (For example, refer to Patent Document 1).

In Patent Document 1, an optical path adjusting device for a magneto-optical disk device is disclosed that comprises a semiconductor laser, a first fixing member (light source holding portion) for holding the semiconductor laser, a collimator lens, and a second fixing member (optical system holding portion) for holding the collimator lens. In this optical path adjusting device, the first fixing member and the second fixing member are fixed by a bolt with the first fixing member positioned in relation to the second fixing member (position adjusting for optical path adjusting).

PRIOR ART DOCUMENTS

Patent Documents

[Patent Document 1] Japanese Unexamined Patent Application Publication No. H5-323166

However, with the optical path adjusting device for a magneto-optical disk device disclosed in Patent Document 1, position displacement of the first fixing member and the second fixing member may occur due to fastening torque of a bolt when fixing the first fixing member and the second fixing member with a bolt. Furthermore, when the first fixing member and the second fixing member are fixed with a bolt, the fixation may become loose due to vibrations, shocks, temperature changes, and the like, possibly causing the position displacement of the first fixing member and the second fixing member.

Moreover, when the fixing members are fixed with an adhesive, position displacement may occur when curing is complete by the contraction and expansion of the adhesive because curing begins from when the adhesive is applied after positioning. Furthermore, position displacement may occur due to temperature change and the like. Therefore, the position displacement of the first fixing member and the second fixing member may occur, similarly to the case of fixing with a bolt.

One or more embodiments of this invention provide a projector and head up display device that can fix a high-precision positioning of a light source holding portion and an optical system holding portion and can maintain the high-precision positioning.

SUMMARY OF THE INVENTION

The projector according to examples of a first aspect of this invention comprises a light source unit (or "light source portion") and an optical scanning portion that scans light from the light source unit, wherein the light source unit includes a light source holding portion (or "first holder") for holding a light source and an optical system holding portion (or "second holder") for holding an optical system (or "optical portion") where light from the light source is emitted, the light source holding portion and the optical system holding portion being laser welded together.

In accordance with one or more embodiments, the light source holding portion and the optical system holding portion are arranged, in that order, when viewed from a light emitting direction.

With the projector according to examples of the first aspect of the present invention, a light source holding portion and an optical system holding portion are laser welded together as described above. As a result, for example, fastening torque does not occur, different than when the light source holding portion and the optical system holding portion are fixed by a bolt or the like. As a result, the light source holding portion and the optical system holding portion can be positioned and fixed with high-precision because position displacement when fixing the light source holding portion and the optical system holding portion can be suppressed. Furthermore, because the light source holding portion and the optical system holding portion can be integrated by laser welding, the occurrence of position displacement of the light source holding portion and the optical system holding portions due to vibrating, shock, temperature changes, and the like can be suppressed with the light source holding portion and the optical system holding portion fixed by laser welding. As a result, the high-precision positioning of the light source holding portion and the optical system holding portion can be maintained with the light source holding portion and the optical system holding portion fixed by laser welding. As a result, it is possible to fix the light source holding portion and the optical system holding portion with a high-precision positioning and the high-precision positioning can be maintained.

With the projector according to examples of the first aspect described above, the light source holding portion and the optical system holding portion may be laser welded in a plurality of positions sandwiching the light source. If configured in this manner, it is possible to more strongly fix the light source holding portion and the optical system holding portion compared to fixing the light source holding portion and the optical system holding portion by laser welding in only one location.

With the projector according to examples of the first aspect described above, the light source holding portion and the optical system holding portion may be made of light transmitting resin, and the other of the light source holding portion and the optical system holding portion to be made of light absorbing resin. If configured in this manner, the light source holding portion and the optical system holding portion can be easily fixed using laser welding.

In this case, the light source holding portion may be made of light transmitting resin, and the optical system holding portion may be made of light absorbing resin. If configured in this manner, laser light used for laser welding can be irradiated from the light source holding portion side (light transmitting resin side) opposite the optical system holding portion with many ordinary various members (for example, optical members such as prisms following an optical system) provided. As a result, the light source holding portion and the optical system holding portion can be fixed by laser welding.

In a configuration where the light source holding portion is made of light transmitting resin and the optical system holding portion is made of light absorbing resin, the light source holding portion made of light transmitting resin may have a protruding portion protruding from a side opposite the optical system holding portion in a position corresponding to the region to be laser welded. If configured in this manner, a transparent plate and the protruding portion of the light source holding portion protruding from the side opposite the optical system holding portion can be easily adhered when irradiating laser light used for laser welding with the light source holding portion made of light transmitting resin being pressed by the transparent plate (for example, a glass plate) that transmits laser light from the side opposite the optical system holding portion. As a result, air becoming interposed (a layer of air) between the transparent plate and the protruding portion of the light source holding portion can be easily suppressed. Therefore, it is possible to suppress fixing by laser welding not being sufficiently performed due to the light condensing position (focus point) of the laser light being displaced by air (a layer of air).

With the projector according to one or more embodiments of the first example described above, the light source unit may additionally include a housing for holding the optical system holding portion with the light source holding portion and the optical system holding portion laser welded, and for the optical system holding portion and the housing to be fastened by a fastening member. If configured in this manner, fixing can be done by laser welding with high-precision positioning with the light source holding portion and the optical system holding portion that require a high-precision positioning because they are arranged relatively closely, and a fixing configuration by a fastening member that can easily perform a fixing operation can be achieved with the optical system holding portion and the housing that do not require a relatively high-precision positioning (where error is relatively allowable). Furthermore, the housing and the optical system holding portion are both made of light absorbing resin, and the housing and the optical system holding portion can be easily fixed by a fastening member even when laser welding is difficult.

With the projector according to one or more embodiments of the first example described above, the light source unit may additionally include a housing for holding the optical system holding portion with the light source holding portion and the optical system holding portion laser welded, and for the optical system holding portion and the housing to be laser welded together. If configured in this manner, in addition to the light source holding portion and the optical system holding portion, a fixing can also be performed with a high-precision positioning on the optical system holding portion and the housing.

The head up display device according to examples of the second aspect of this invention comprises a light source unit and an optical scanning portion that scans light from the light source unit corresponding to a virtual image that a user views, and the light source unit includes a light source holding portion for holding a light source and an optical system holding portion for holding an optical system where light from the light source is emitted, the light source holding portion and the optical system holding portion being laser welded together.

With the head up display device according to examples of the second aspect of this invention, a light source holding portion and an optical system holding portion are laser welded together as described above. As a result, it is possible to fix the light source holding portion and the optical system holding portion with a high-precision positioning and maintain the high-precision positioning even with the head up display device according to examples of the second aspect. Furthermore, with the head up display device where high brightness is required, it is common that the light source held by the light source holding portion and the optical system held by the optical system holding portion to be arranged closer than an ordinary projector. When the light source and the optical system are arranged close, fixing with a higher precision positioning is required because the effects of position displacement are great. Therefore, it is extremely practically effective in the head up display device to be able to fix the light source holding portion and the optical system holding portion with a high-precision positioning and to maintain the high-precision positioning.

According to one or more embodiments of the present invention, a projector and head up display device can be provided that can fix a high-precision positioning of a light source holding portion and an optical system holding portion and can maintain the high-precision positioning.

DETAILED DESCRIPTION OF EMBODIMENTS

Specific embodiments of the present invention will be described below using the drawings.

First Example

First, the configuration of a head up display device 100 according to one or more embodiments of the first example of the present invention will be described with reference to FIG. 1. The head up display device 100 is one example of a "projector" of the present invention.

Figure 1:
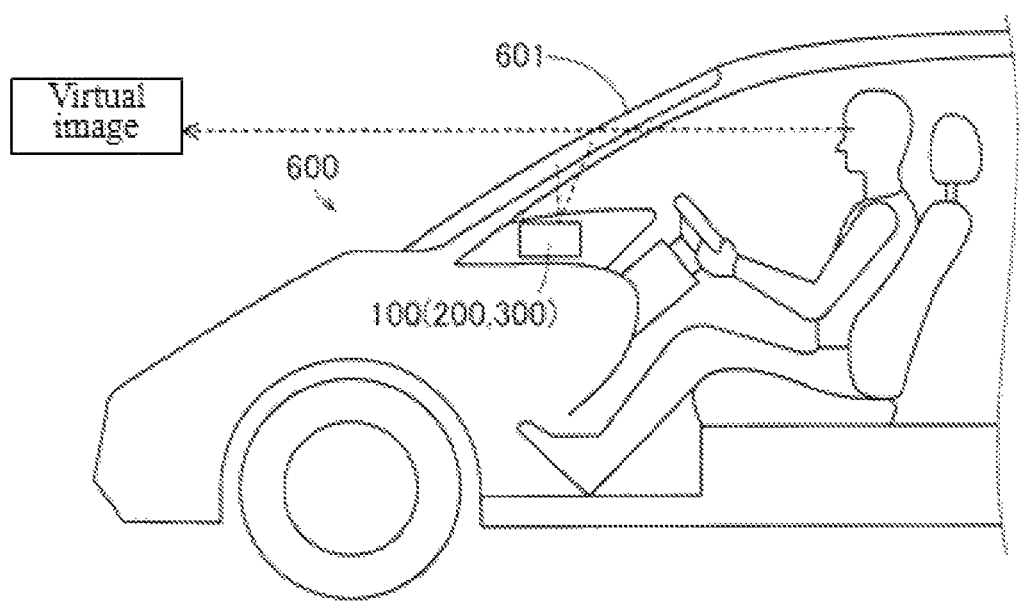
FIG. 1 is a diagram illustrating the head up display device according to one or more embodiments of the first through the third examples of the present invention being mounted on an automobile.

The head up display device (disclosed below as HUD device) 100 according to one or more embodiments of the first example of the present invention is configured to mount on a transportation apparatus such as an automobile 600, as illustrated in FIG. 1. Moreover, the HUD device 100 is configured to project (irradiate) light forming a projection image on a screen 601 such as a front glass or a combiner not illustrated in the diagrams. The light forming the projection image projected on the screen 601 is then reflected on the screen 601, and viewed by the user. At this time, the projection image is viewed by the user as a virtual image in a position in front of the user on the screen 601. This HUD device 100 is configured to project information relating to car navigation, the speed of the automobile 600, information of various notifications, and the like as a projection image.

Figure 2:
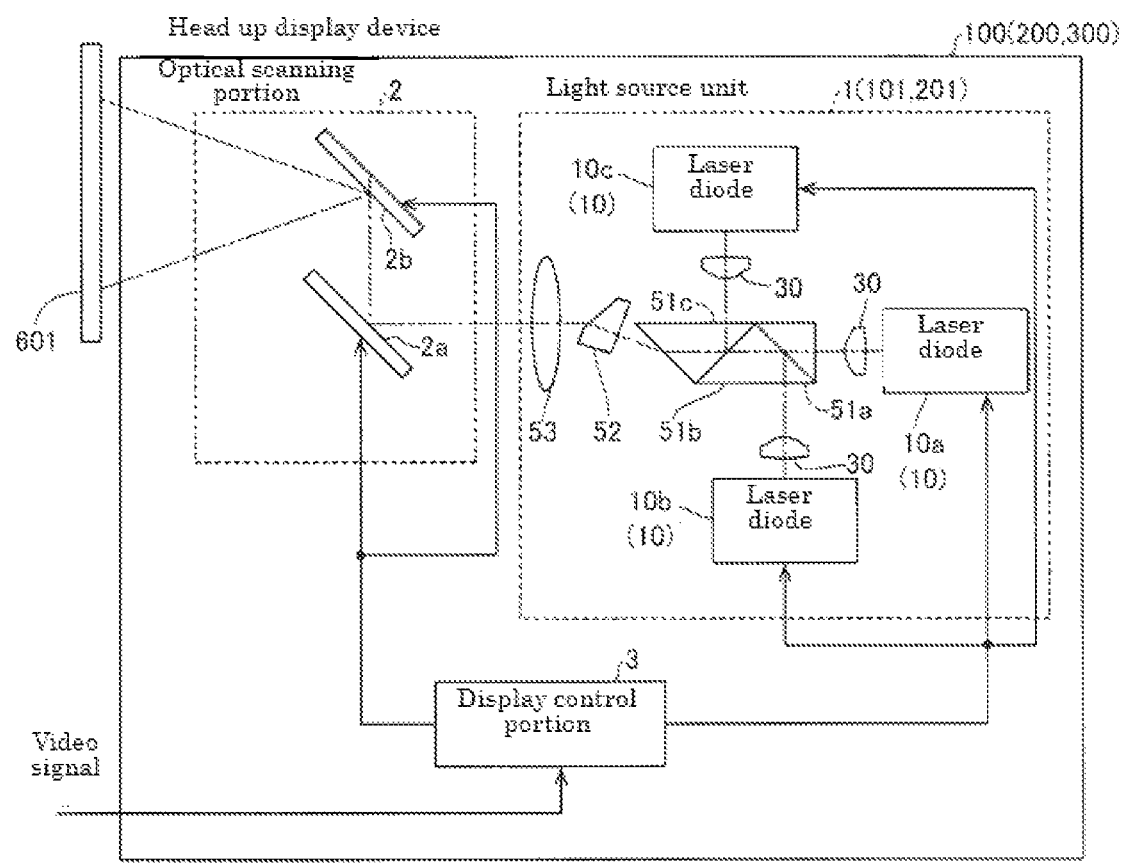
FIG. 2 is a block diagram illustrating the overall configuration of the head up display device according to one or more embodiments of the first through the third examples of the present invention.

Furthermore, the HUD device 100 comprises a light source unit 1, an optical scanning portion 2, and a display control portion 3, as illustrated in FIG. 2.

Here, in one or more embodiments of the first example, the light source unit 1 includes three (blue (B), red (R), and green (G)) laser diodes 10 (10a, 10b, and 10c) and three light source holding portions 20 for holding each of the three laser diodes 10. Furthermore, the light source unit 1 includes three collimator lenses 30 that emit laser light from each of the three laser diodes 10, and three optical system holding portions 40 for holding each of the three collimator lenses 30. In this HUD device 100, the light source holding portion 20 and the optical system holding portion 40 are laser welded together. The laser diode 10 and the collimator lens 30 are each one example of a "light source" and "optical system" of the present invention. More generally, the "optical system" may comprise a collimator lens. Details regarding the fixation of the light source holding portion 20 for holding the laser diode 10 and the optical system holding portion 40 for holding the collimator lens 30 by laser welding will be described later.

Figure 3:
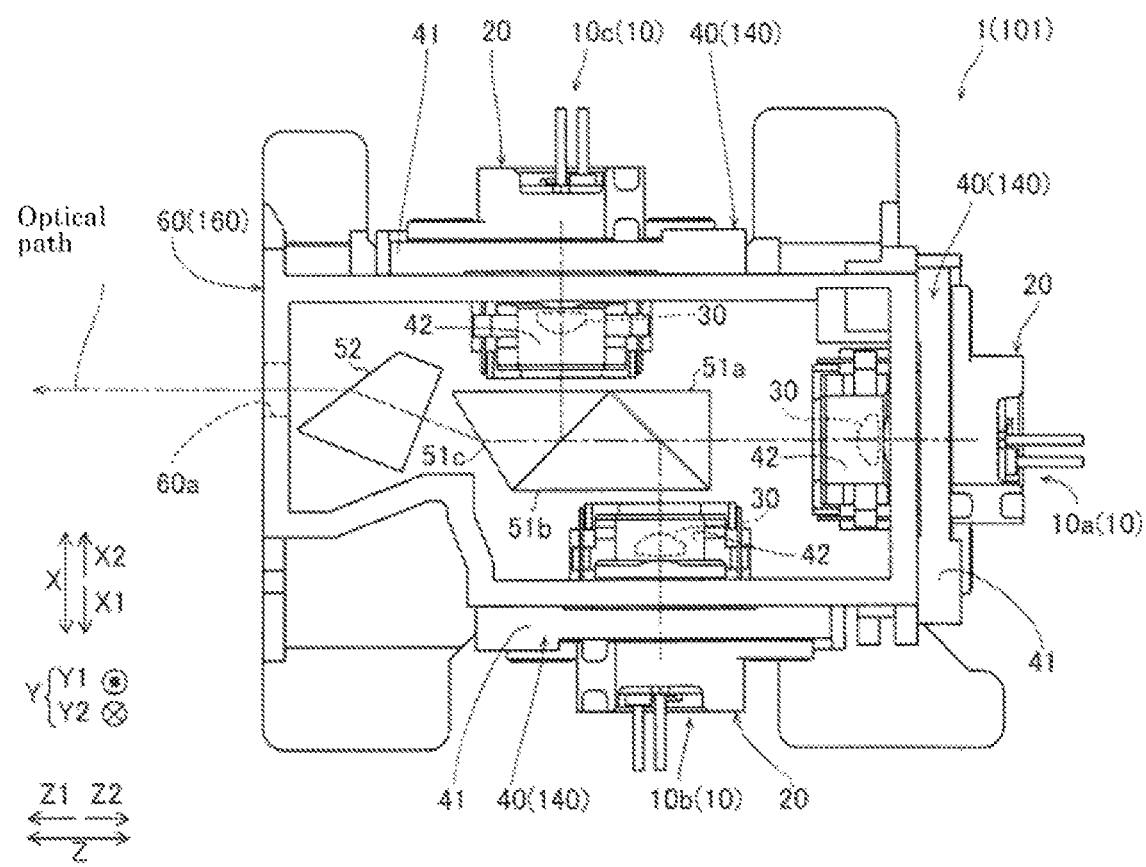
FIG. 3 is a perspective view illustrating the light source unit of the head up display device according to one or more embodiments of the first and the second examples of the present invention.

Moreover, as illustrated in FIG. 2 and FIG. 3, the light source unit 1 includes three prisms 51a, 51b, and 51c for providing an optical axis for each laser light by combining three (blue (B), red (R), and green (G)) laser lights, a beam shaping prism 52 for shaping a spot shape of the laser light that has passed through the prisms 51a, 51b, and 51c, and a condenser lens 53 for condensing the laser light that has passed through the beam shaping prism 52.

Furthermore, the light source unit 1 includes a housing 60 for holding various members as illustrated in FIG. 3. The housing 60 is configured to hold the optical system holding portion 40 with the light source holding portion 20 holding the laser diode 10 and the optical system holding portion 40 holding the collimator lens 30 laser welded together.

Specifically, the in housing 60, the members (light source holding portion 20, collimator lens 30, and optical system holding portion 40) corresponding to the three (blue (B), red (R), and green (G)) laser diodes 10a to 10c are each held on a surface of a Z2 direction side, a surface of an X1 direction side, and a surface of an X2 direction side. Moreover, the three prisms 51a to 51c and a beam shaping prism 52 are provided inside the housing 60.

In the light source unit 1, the laser diode 10a is configured to irradiate blue laser light to the optical scanning portion 2 by passing through the three prisms 51a, 51b, and 51c, the beam shaping prism 52, and a condenser lens 53. Moreover, the laser diode 10b is configured to irradiate red laser light to the optical scanning portion 2 by passing through the prisms 51b, and 51c, the beam shaping prism 52, and the condenser lens 53. Furthermore, the laser diode 10c is configured to irradiate green laser light to the optical scanning portion 2 by passing through the prism 51c, the beam shaping prism 52, and the condenser lens 53. In other words, the laser light emitted from the three laser diodes 10a to 10c are emitted from an emitting opening 60a of the housing 60 toward the optical scanning portion 2, taking a light path shown by a dashed line. The condenser lens 53 is not illustrated in FIG. 3.

The optical scanning portion 2 includes a horizontal optical scanning portion 2a for scanning laser light from the laser diode 10 in a horizontal scanning direction and a vertical optical scanning portion 2b for scanning laser light from the laser diode 10 in a vertical scanning direction. The horizontal optical scanning portion 2a and the vertical optical scanning portion 2b are each configured by a micro electro mechanical system (MEMS) mirror.

In the optical scanning portion 2, the horizontal optical scanning portion 2a is configured to scan in the horizontal scanning direction with respect to the screen 601 of the automobile 600 (refer to FIG. 1) via the vertical optical scanning portion 2b by reflecting the laser light from the laser diode 10. Furthermore, the vertical optical scanning portion 2b is configured to scan in the vertical scanning direction with respect to the screen 601 of the automobile 600 by reflecting again the laser light reflected in the horizontal optical scanning portion 2a. In this manner, the optical scanning portion 2 is configured to scan laser light from the laser diode 10 (in other words, light that forms the projection image) in the horizontal scanning direction and the vertical scanning direction with respect to the screen 601. As a result, the light that forms the projection image is projected (irradiated) to the screen 601.

The display control portion 3 is configured to control the projection of the projection image based on a video signal input from the exterior. Specifically, the display control portion 3 is configured to control the irradiation of laser light by the laser diode 10 (10a, 10b, and 10c) as well as control the driving of the optical scanning portion 2 (2a and 2b) based on the video signal input from the exterior. As a result, the display control portion 3 is configured to control the optical scanning portion 2 and the laser diode 10 and performs a control that projects the projection image to the screen 601.

Next, a configuration of the laser diode 10, the light source holding portion 20, the collimator lens 30, and the optical system holding portion 40 will be described in detail with reference to FIGS. 3 to 9. Three of each of the laser diode 10, the light source holding portion 20, the collimator lens 30, and the optical system holding portion 40 are provided, and all are substantially the same with the exception of the color of the laser light emitted from the laser diodes 10 being different, and therefore a description is given with a configuration corresponding to the laser diode 10a (disclosed below as simply laser diode 10) provided on the surface of the Z1 direction side of the housing 60 as an example with reference to FIGS. 4 to 8.

Figure 4:
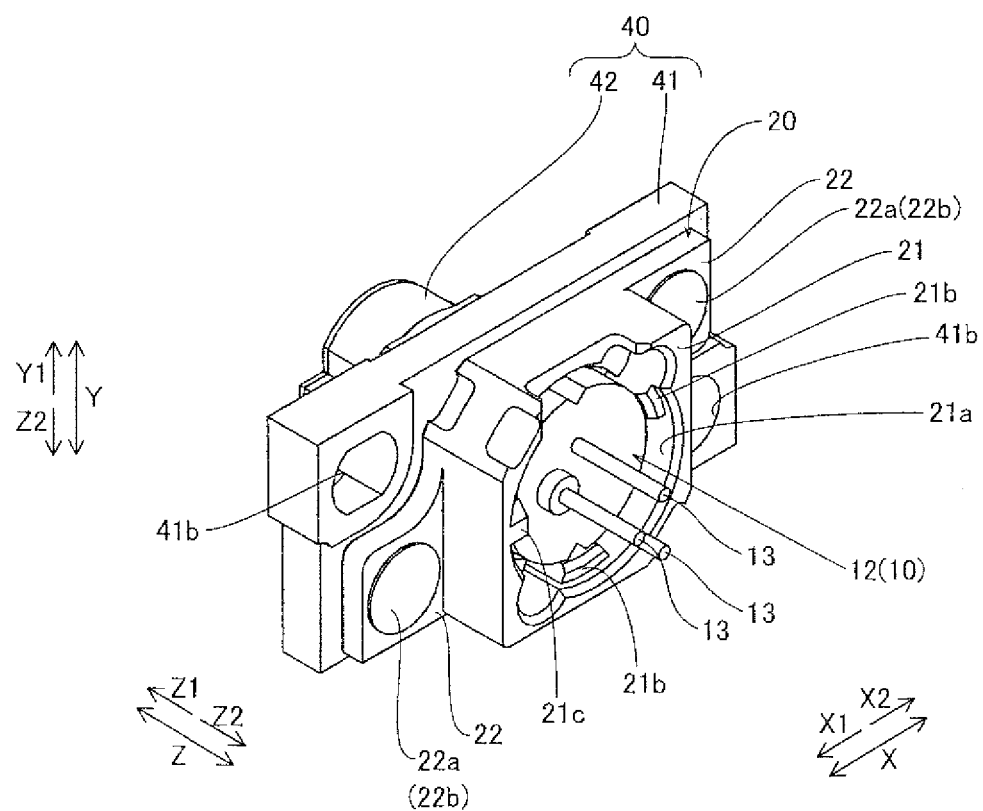
FIG. 4 is a perspective view of the light source holding portion and optical system holding portion of the head up display device according to one or more embodiments of the first example of the present invention, viewed from the light source holding portion side.
Figure 6:
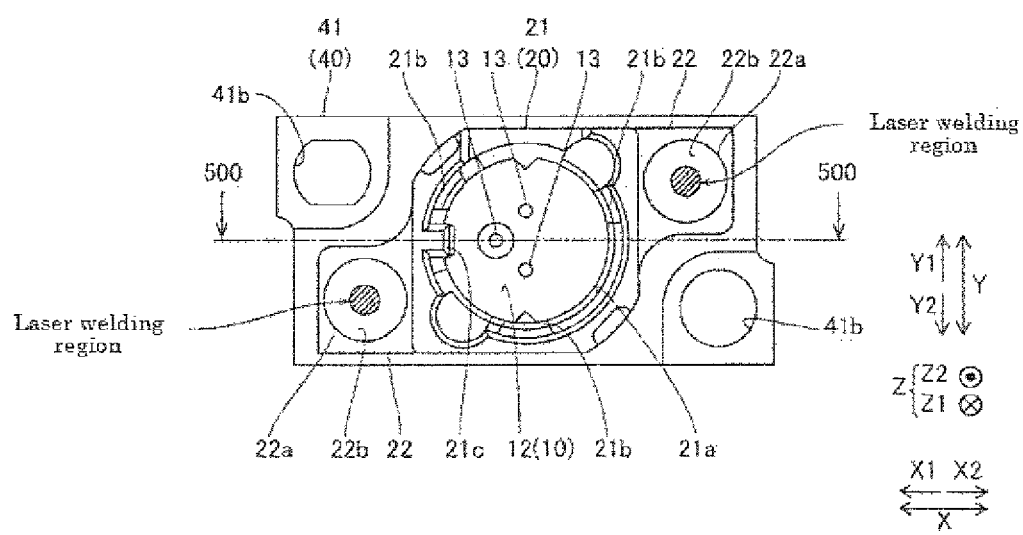
FIG. 6 is a perspective view of the light source holding portion and optical system holding portion of the head up display device according to one or more embodiments of the first example of the present invention, viewed from the optical axis direction.
Figure 7:
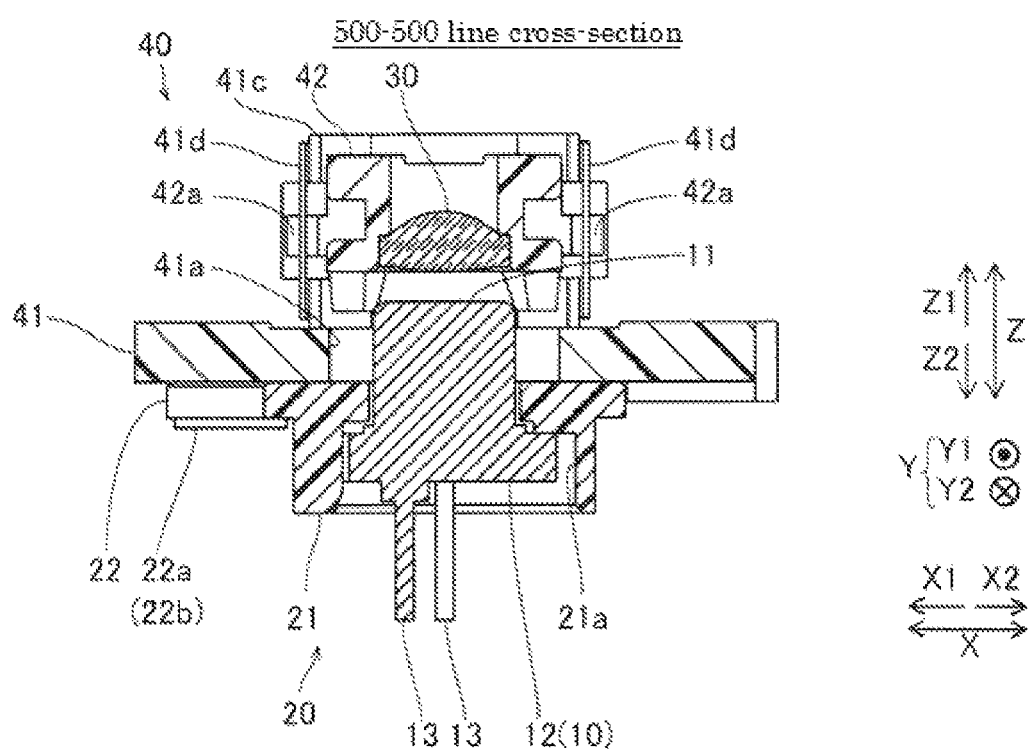
FIG. 7 is a cross-sectional view along the 500-500 line in FIG. 6.

The laser diode 10 has a light emitting portion 11, a stem 12, and three terminal portions 13 as illustrated in FIGS. 4, 6, and 7. The light emitting portion 11, the stem 12, and the three terminal portions 13 are all made of metal.

The light emitting portion 11 is formed in a column shape that extends in the optical axis direction (Z direction). Furthermore, a semiconductor laser element or the like is provided in the interior of the light emitting portion 11. The step 12 is configured to be formed in a column shape that extends in the optical axis direction (Z direction) with a diameter less than the light emitting portion 11, and to support the light emitting portion 11. The three terminal portions 13 are configured formed in a column shape extending from the stem 12 in a direction towards a side opposite to the light emitting portion 11, and so that electrical power from the power source is supplied via a wiring portion (for example, flexible print substrate) or the like not illustrated in the diagrams. With the laser diode 10, the laser light from the light emitting portion 11 is emitted by the electrical power from the power source being supplied to the terminal portion 13.

Here, in one or more embodiments of the first example, the light source holding portion 20 has a main body portion 21, and two welding fixing portions 22 as illustrated in FIGS. 4, 6, and 7. Furthermore, the light source holding portion 20 is made of light transmitting resin (here, polyphenylene sulfide (PPS) resin). Here, light transmitting refers to the characteristics of transmitting around 15% or more, or 20% or more of laser light of a prescribed wavelength used for laser welding (for example, around 800 nm to around 1100 nm).

The main body portion 21 is formed in a substantially rectangular shape from the optical axis direction (Z direction). Furthermore, an opening portion 21a for holding the laser diode 10 in the center of the substantially rectangular shape is provided on the main body portion 21. The opening portion 21a is formed in a substantially circular shape slightly larger than the diameter of the stem 12 of the laser diode 10 when viewed from the optical axis direction, and has three fitting members 21b provided in a prescribed angle interval (about 120 degree intervals) on the inner peripheral edge of the substantially circular shape. Furthermore, a rotational positioning portion 21c is provided in addition to the three fitting portions 21b on the inner peripheral edge of the opening portion 21a with a substantially circular shape. The three fitting portions 21b and the rotational positioning portion 21c are each formed so as to protrude from the inner side direction (direction towards the center of the circle) of the opening portion 21a. The main body portion 21 is configured to hold the laser diode 10 by fitting with pressure the fitting portion 21b with the stem 12 of the laser diode 10 positioned in the rotational direction with the optical axis direction as the axis by the rotational positioning portion 21c.

Each of the two welding fixing portions 22 are formed in a substantially rectangular shape when viewed from the optical axis direction (Z direction). Moreover, the two welding fixing portions 22 are provided in a position that does not overlap the laser diode 10 and are provided in a position of point symmetry sandwiching the laser diode 10 when viewed from the optical axis direction (Z direction). Moreover, the two welding fixing portions 22 are both formed with the thickness in the Z direction being sufficiently smaller than the main body portion 21. This is because while a prescribed thickness is necessary for holding the laser diode 10, it is also necessary for the welding fixing portion 22 to be configured so that laser light transmits easily by making the thickness smaller to an extent so that laser light for laser welding transmits. The thickness, in the optical axis direction (Z), of the welding fixing portions 22 (laser welding region) of the light source holding portion 20 may be 0.2 to 10 mm.

Furthermore on each of the two welding fixing portions 22, a protruding portion 22a protruding from the side opposite (Z2 direction) of the optical system holding portion 40, the protruding portion 22a being formed in a substantially columnar shape protruding towards the Z2 direction from the welding fixing portion 22, and an edge surface 22b of the Z2 direction side of the substantial column is formed substantially flat. Furthermore, the substantially columnar protruding portion 22a is formed with the diameter thereof to be sufficiently larger than the spot diameter of the laser light for laser welding. The protruding portion 22a is formed so as to function as an eject pin (E/P) when resin material is released from the mold. As a result, it is possible for the shape of the light source holding portion 20 becoming complicated to be suppressed when compared to a case where E/P are provided other than the protruding portion 22a.

The light source holding portion 20 is laser welded with the optical system holding portion 40 on a back surface (surface of the Z2 direction side) corresponding to the protruding portion 22a of the two welding fixing portions 22. In FIG. 6, the location where laser welding is performed (laser welding region) is schematically illustrated by hatching to understand easier.

The optical system holding portion 40 comprises a base portion 41 and an optical system holding member 42 removable from the base portion 41, as illustrated in FIGS. 3 to 7. As illustrated in FIG. 7, the collimator lens 30 is held in the interior of the optical system holding member 42. Further, both the base portion 41 and the optical system holding member 42 are made of resin.

Furthermore, the base portion 41 is made of light absorbing resin (here, polyphenylene sulfide (PPS) resin). In other words, the base portion 41 is formed by the same resin material (PPS) as the light source holding portion 20. Here, light absorbency refers to the characteristics of substantially absorbing laser light (not substantially transmitting) of a prescribed wavelength used for laser welding (for example, around 800 nm to around 1100 nm). For example, a method for adjusting the transmittance (absorbency) of the laser light for welding by adjusting the ratio that an absorbing pigment such as a pigment or a dye is distributed to the resin may be used as the method for forming the light transmitting resin and the light absorbing resin by a common resin material.

Figure 9:
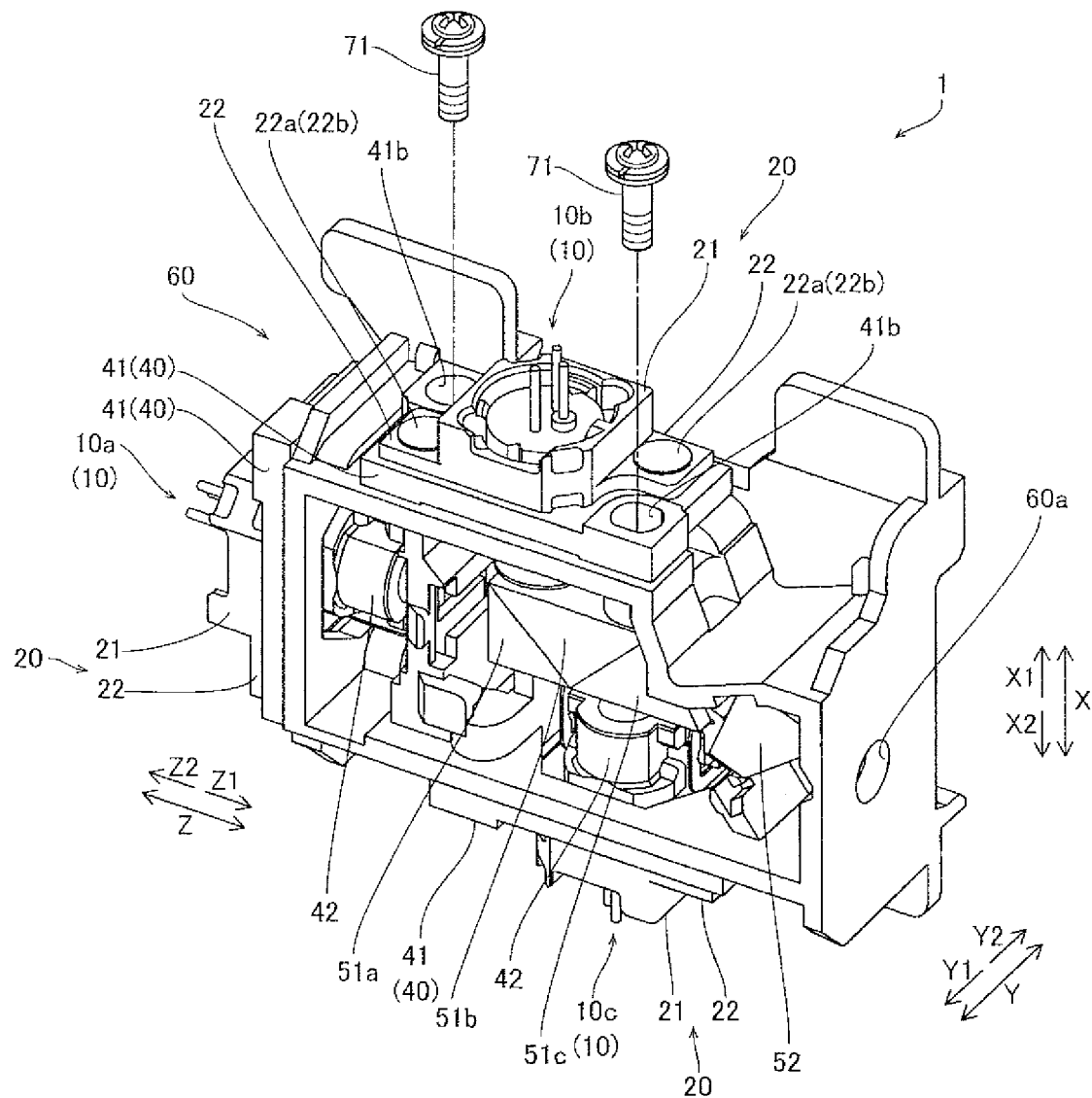
FIG. 9 is a perspective view for describing a fixation of the optical system holding portion and housing of the head up display device according to one or more embodiments of the first example of the present invention by a screw member.

Furthermore, the base portion 41 is formed in a substantially rectangular shape from the optical axis direction (Z direction). Moreover, an opening 41a that is penetrated by the light emitting portion 11 of the laser diode 10 is provided in the center of the substantial rectangle on the base portion 41. Furthermore, two penetration holes 41b are provided on the base portion 41, in a position that does not overlap the two welding fixing portions 22 of the light source holding portions 20 from the optical axis direction. The two penetration holes 41b are provided so that a screw member 71 illustrated in FIG. 9 is penetrating, and are each arranged in a position of point symmetry sandwiching the laser diode 10. The optical system holding portion 40 is configured to fix to the housing 60 by fastening the base portion 41 in two places on the housing 60 by the screw member 71. The screw member 71 is one example of a "fastening member" of the present invention.

Furthermore, a pedestal portion 41c for arranging the optical system holding member 42 is provided on the side opposite of the light source holding portions 20, and two pressing portions 41d are provided on both sides of the X direction of the pedestal portion 41c in the base portion 41.

Figure 5:
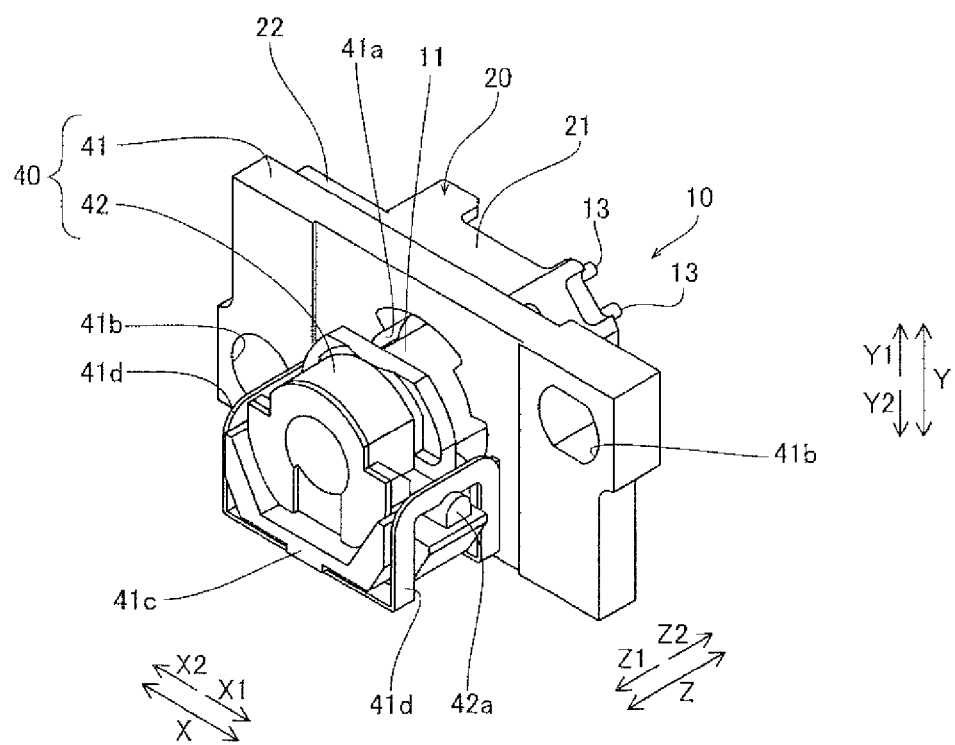
FIG. 5 is a perspective view of the light source holding portion and optical system holding portion of the head up display device according to one or more embodiments of the first example of the present invention, viewed from the optical system holding portion side.

The optical system holding member 42 is configured to be arranged on the pedestal portion 41c with the collimator lenses 30 held in the interior. Furthermore, a receiving portion 42a that engages with the pressing portions 41d of the base portion 41 is provided on both sides in the X direction on the optical system holding member 42. The optical system holding member 42 is installed to the base portion 41 by the receiving portion 42a being pressed in a Y2 direction by the pressing portions 41d arranged on the pedestal portion 41c as illustrated in FIG. 5. The optical system holding member 42 is able to slide in the optical axis direction (Z direction) on the pedestal portion 41c with the receiving portion 42a being pressed in the Y2 direction by the pressing portions 41d. In this state, the optical system holding member 42 is fixed to the pedestal portion 41c by an adhesive after the positioning (position adjustment) of laser diodes 11 in the optical axis direction.

Next, the fixing by laser welding of the light source holding portion 20 and the optical system holding portion 40 will be described with reference to FIGS. 7 and 8. Afterward, the fixing of the optical system holding portion 40 and the housing 60 by the screw member 71 will be described with reference to FIG. 9.

First, as illustrated in FIG. 7, the positioning of the laser diode 10 held by the light source holding portion 20 and the collimator lens 30 held by the optical system holding portion 40 (position adjustment) is performed. Specifically, the optical system holding member 42 of the optical system holding portion 40 is slid in the optical axis direction (Z direction) and the positioning of the collimator lens 30 and the laser diode 10 in the optical axis direction is performed. Then, by moving in the XY plane with the light source holding portion 20 pressed to the base portion 41 of the optical system holding portion 40, the positioning in the XY plane of the collimator lens 30 and the laser diode 10 is performed.

Then, after the relative position of the collimator lens 30 and the laser diode 10 has been determined, the optical system holding member 42 and the base portion 41 are fixed by an adhesive, and the light source holding portion 20 and the optical system holding portion 40 are fixed by laser welding.

Figure 8:
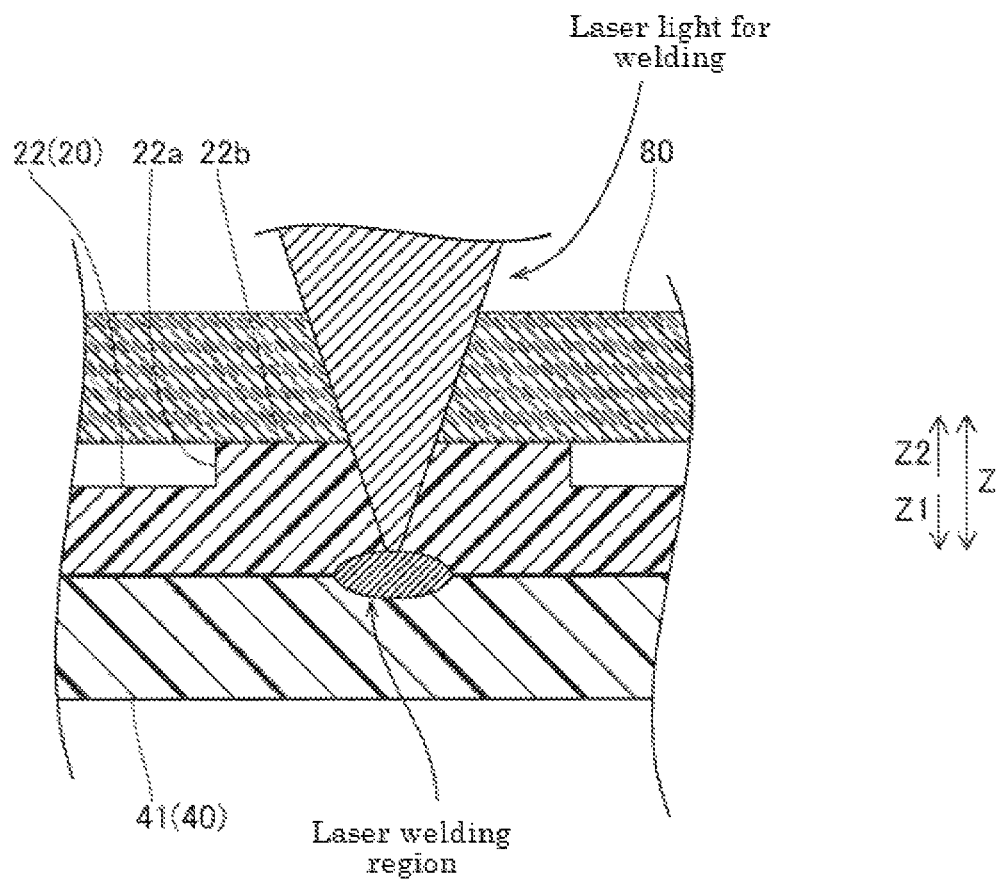
FIG. 8 is a schematic diagram for describing a fixation of the light source holding portion and the optical system holding portion of the head up display device of one or more embodiments of the present invention by laser welding.

Specifically, as illustrated in FIG. 8, laser welding is performed in the light source unit 1 with the light source holding portion 20 pressed to the Z1 direction side (in other words, the optical system holding portion 40 side) by a glass plate 80 that transmits laser light for welding of a prescribed wavelength (for example, around 800 nm to around 1100 nm) for welding. More specifically, laser welding is performed in the light source unit 1 with the glass plate 80 pressed to the edge surface 22b of the protruding portion 22a of the light source holding portion 20.

When laser welding is being performed, the laser light for welding is irradiated from the light source holding portion 20 side (Z2 direction side) to the protruding portion 22a of the light source holding portion 20. At this time, the laser light for welding is irradiated to focus on the welding region of the boundary surface of the light source holding portion 20 and the optical system holding portion 40. Then, the laser light for welding transmits through the transparent glass plate 80 and the protruding portion 22a of the light source holding portion 20 made of light transmitting resin, and is absorbed by the optical system holding portion 40 made of light absorbing resin. As a result, as illustrated in FIG. 8, the light source holding portion 20 made of light transmitting resin and the optical system holding portion 40 made of light absorbing resin are both fused in the welding region of the boundary surface of the light source holding portion 20 and the optical system holding portion 40. As a result, the light source holding portion 20 and the optical system holding portion 40 are welded. The laser welding is performed on both of the protruding portions 22a of the two welding fixing portions 22.

The positioning (position adjustment) of the laser diode 10 and the housing 60 is performed with the light source holding portion 20 and the optical system holding portion 40 laser welded, so that the optical axis of the design and the optical axis of the laser diode 10 conform to each other, as illustrated in FIG. 9. Specifically, the positioning (position adjustment) of the laser diode 10 and the housing 60 is performed by moving the optical system holding portion 40 on a plane parallel to the side surface of the housing 60 with the optical system holding portion 40 pressed to the side surface of the housing 60. Then, after determining the relative position of the laser diode 10 and the housing 60, the optical system holding portion 40 is fixed (fastened) to the housing 60 by the two screw members 71.

The following effects can be achieved in one or more embodiments of the first example.

In one or more embodiments of the first example, the light source holding portion 20 and the optical system holding portion 40 are laser welded together, as described above. As a result, for example, fastening torque does not occur because the light source holding portion 20 and the optical system holding portion 40 are fixed by laser welding, different than when the light source holding portion 20 and the optical system holding portion 40 are fixed by a bolt or the like. As a result, the light source holding portion 20 and the optical system holding portion 40 can be positioned and fixed with high-precision because position displacement when fixing the light source holding portion 20 and the optical system holding portion 40 can be suppressed. Furthermore, because the light source holding portion 20 and the optical system holding portion 40 can be integrated by laser welding, the occurrence of position displacement of the light source holding portion 20 and the optical system holding portion 40 due to vibrating, shock, temperature change, and the like can be suppressed with the light source holding portion 20 and the optical system holding portion 40 fixed by laser welding. As a result, the high-precision positioning of the light source holding portion 20 and the optical system holding portion 40 can be maintained with the light source holding portion 20 and the optical system holding portion 40 fixed by laser welding. As a result, it is possible to fix the light source holding portion 20 and the optical system holding portion 40 with high-precision positioning and the high-precision positioning can be maintained. Therefore, the brightness and image quality of the projection image projected on the screen 601 of the automobile 600 reducing due to position displacement of the light source holding portion 20 and the optical holding portion 40 occurring can be suppressed by the head up display device 100.

Furthermore, in the head up display device 100 used where outside light (environmental light) has significant effect such as the screen 601 of the automobile 600, high brightness is especially required. In the head up display device 100 where high brightness is required, the laser diode 10 held by the light source holding portion 20 and the collimator lens 30 held by the optical system holding portion 40 are arranged closer than an ordinary projector, as illustrated in FIG. 7. When the laser diode 10 and the collimator lens 30 are arranged close, fixing with a higher precision positioning is required because the effects of position displacement are great. Therefore, it is extremely practically effective in the head up display device 100 to be able to fix the light source holding portion 20 and the optical system holding portion 40 with high-precision positioning and to maintain the high-precision positioning.

Furthermore, in one or more embodiments of the first example, the light source holding portion 20 and the optical system holding portion 40 are laser welded together in a plurality of positions that sandwich the laser diode 10 (in other words, positions that correspond to the two welding fixing portions 22), as described above. As a result, it is possible to more strongly fix the light source holding portion 20 and the optical system holding portion 40 compared to fixing the light source holding portion 20 and the optical system holding portion 40 by laser welding in only one location.

Moreover, in one or more embodiments of the first example, the light source holding portion 20 is made of light transmitting resin, and the optical system holding portion 40 is made of light absorbing resin as described above. As a result, the light source holding portion 20 and the optical system holding portion 40 can be easily fixed using laser welding.

Furthermore, because the light source holding portion 20 is made of light transmitting resin and the optical system holding portion 40 is made of light absorbing resin, laser light used for laser welding can be irradiated from the light source holding portion 20 side (in other words, light transmitting resin side) opposite the optical system holding portion 40 with many of various members (optical members such as the prisms 51a to 51c following the collimator lenses 30) provided. As a result, the light source holding portion 20 and the optical system holding portion 40 can be fixed by laser welding.

Furthermore, in one or more embodiments of the first example, the light source holding portion 20 made of light transmitting resin has a protruding portion 22a protruding from the side opposite the optical system holding portion 40 in a position corresponding to the region to be laser welded (in other words, the position of the welding fixing portion 22), as described above. As a result, the glass plate 80 and the protruding portion 22a of the light source holding portion 20 protruding from the side opposite the optical system holding portion 40 can be easily adhered when irradiating laser light used for laser welding with the light source holding portion 20 made of light transmitting resin being pressed by the glass plate 80 that transmits laser light from the side opposite the optical system holding portion 40. As a result, air becoming interposed (a layer of air) between the glass plate 80 and the protruding portion 22a of the light source holding portion 20 can be easily suppressed. Therefore, it is possible to suppress fixing by laser welding not being sufficiently performed due to the light condensing position (focus point) of the laser light being displaced by air (a layer of air).

Moreover, in one or more examples of the present invention, the optical system holding portion 40 and the housing 60 are fastened by the screw member 17 as described above. As a result, fixing can be done by laser welding with high-precision positioning with the light source holding portion 20 and the optical system holding portion 40 that require high-precision positioning because they are arranged relatively closely, and an easy fixing configuration with the screw member 71 can be achieved with the optical system holding portion 40 and the housing 60 that do not require relatively high-precision positioning (where error is relatively allowable).

Second Example

Next, one or more embodiments of the second example will be described with reference to FIGS. 1 to 3 and 10. In one or more embodiments of this second example, an example will be described where an optical system holding portion and a housing are fixed by laser welding, different from one or more embodiments of the first example where an optical system holding portion and a housing are fixed by a screw member. Configurations that are the same or substantially similar as those in one or more embodiments of the first example will be shown with the same numerals and descriptions thereof are omitted.

A head up display device 200 according to one or more embodiments of the second example of the present invention (refer to FIG. 1) comprises a light source unit 101 as illustrated in FIGS. 2 and 3. The light source unit 101 includes an optical system holding portion 140 and a housing 160 made of light absorbing resin. The head up display device 200 is one example of a "projector" of the present invention.

Figure 10:
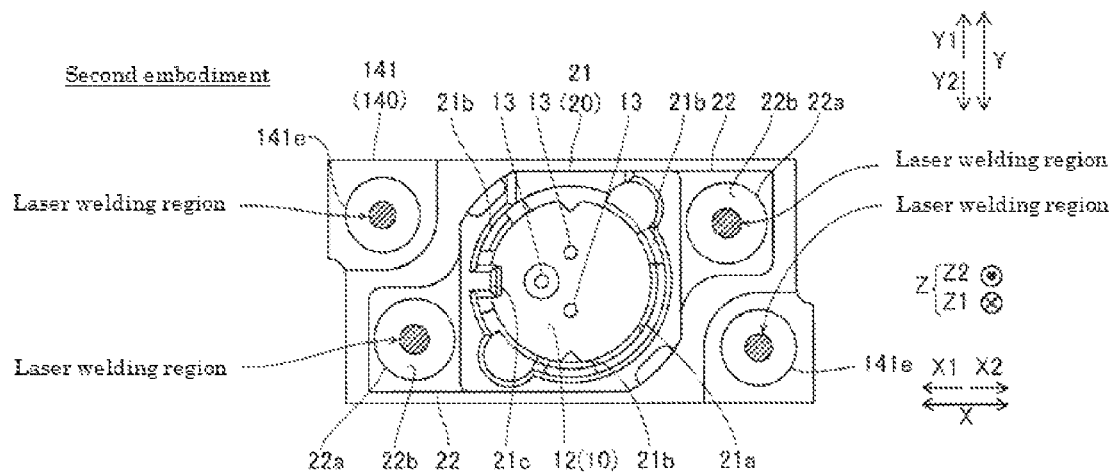
FIG. 10 is a diagram for describing a fixation of the optical system holding portion and housing of the head up display device according to one or more embodiments of the second example of the present invention by laser welding.

Here, in one or more embodiments of the second example, the optical system holding portion 140 comprises a base portion 141 as illustrated in FIG. 10. Two welding fixing portions 141e made of light transmitting resin are provided on the base portion 141. Moreover, the two welding fixing portions 141e are both formed in a substantially circular shape when viewed from the optical axis direction, and each is formed in a position of point symmetry sandwiching the laser diode 10. With the base portion 141, a portion of the welding mixing portion 141e is formed by light transmitting resin, and the other main portion is formed by light absorbing resin. In other words, the base portion 141 is formed by a two color mold of light transmitting resin and light absorbing resin. In FIG. 10, the location where laser welding is performed (laser welding region) is schematically illustrated by hatching to understand easier.

Furthermore, in one or more embodiments of the second example, the light source holding portion 20 and the optical system holding portion 140 are laser welded on the protruding portion 22a of the two welding fixing portions 22 of the light source holding portion 20, and the optical system holding portion 140 and the housing 160 are laser welded on the two welding fixing portions 141e of the optical system holding portion 140. The optical system holding portion 140 can laser weld in four positions illustrated in FIG. 10 because while the back surface side of the protruding portion 22a of the welding fixing portion 22 of the light source holding portion 20 is made of light absorbing resin, the welding fixing portions 141e are made of light transmitting resin.

The other configurations of one or more embodiments of the second example may be the same as those of the first example.

The following effects can be achieved in one or more embodiments of the second example.

In one or more embodiments of the second example, the light source holding portion 20 and the optical system holding portion 140 are laser welded together, as described above. As a result, it is possible to fix the light source holding portion 20 and the optical system holding portion 140 with high-precision positioning and the high-precision positioning can be maintained, as with one or more embodiments of the first example.

Furthermore, in one or more embodiments of the second example, the optical system holding portion 140 and the housing 160 are laser welded together as described above. As a result, in addition to the light source holding portion 20 and the optical system holding portion 140, fixing can also be performed with high-precision positioning on the optical system holding portions 140 and the housing 160.

The other effects of one or more embodiments of the second example may be the same as those of the first example.

Third Example

Figure 11:
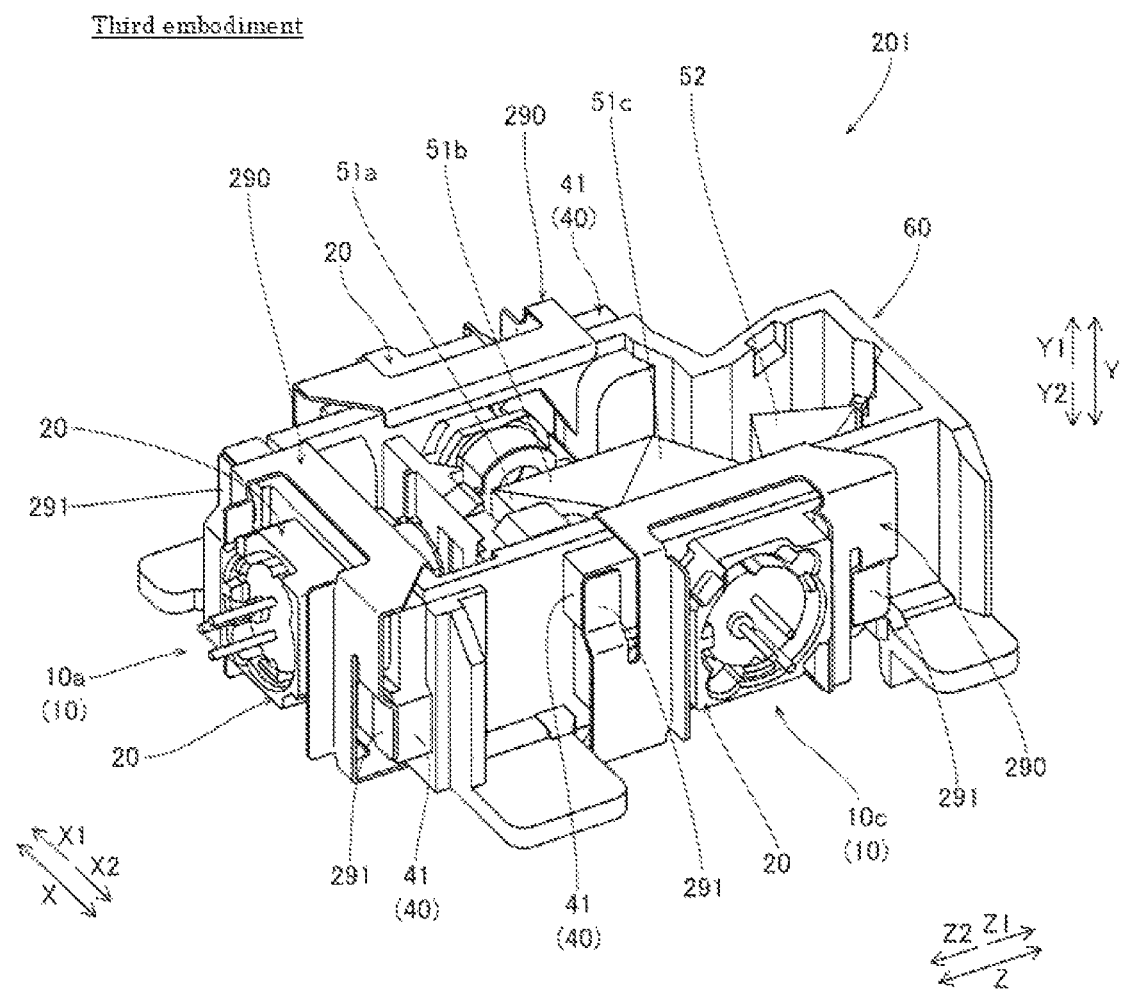
FIG. 11 is a perspective view for describing a fixation of the optical system holding portion and housing of the head up display device according to one or more embodiments of the first example of the present invention by a biasing member.

Next, one or more embodiments of the third example will be described with reference to FIGS. 1, 2, and 11. In one or more embodiments of this third example, an example will be described where an optical system holding portion and a housing are fixed by a biasing member, different from one or more embodiments of the first and second examples. Configurations that are the same or substantially similar as those in the first and second examples will be shown with the same numerals and descriptions thereof are omitted.

A head up display device 300 according to one or more embodiments of the second example of the present invention (refer to FIG. 1) comprises a light source unit 201 as illustrated in FIG. 2. The light source unit 201 includes three biasing members 290 made up of a plate spring as illustrated in FIG. 11. The head up display device 300 is one example of a "projector" of the present invention.

In one or more embodiments of the third example, the optical system holding portion 40 and the housing 60 are fixed by the biasing member 290 with the light source holding portion 20 and the optical system holding portion 40 laser welded. Specifically, in the light source unit 201, the optical system holding portion 40 and the housing 60 are fixed by the optical system holding portion 40 being biased toward the inner side of the housing 60 (inner portion side where the three prisms 51a to 51c are arranged) by the biasing member 290. The three biasing members 290 are provided in positions corresponding to the three optical system holding portions 40.

Two biasing portions 291 are provided on the biasing members 290 for biasing the optical system holding portions 40 toward the inner side of the housing 60. The two biasing portions 291 are each formed in a position of point symmetry sandwiching the laser diode 10.

The other configurations of one or more embodiments of the third example may be the same as those of the first example.

The following effects can be achieved in one or more embodiments of the third example.

In one or more embodiments of the third example, the optical system holding portion 40 and the housing 60 are fixed by the biasing member 290 as described above. As a result, the fixing structure of the optical system holding portion 40 and the housing 60 can be a simple fixing structure by the biasing member 290 made up of a plate spring, similar to the fixing structure by the screw member 71 (refer to FIG. 9).

The other effects of one or more embodiments of the third example may be the same as those of the first example.

One or more embodiments of the examples disclosed are all examples, and should be considered as non-restrictive. The scope of the present invention is shown in the scope of the claims and not in the description of the embodiments above, and all changes (variations) for the scope and meanings of the claims are included therein.

For example, in one or more embodiments of the first through third examples described above, an example was shown where one or more embodiments of the present invention was applied to a projector as the head up display (HUD) device 100 (200, 300), but the present invention is not so limited. One or more embodiments of the present invention may be applied to projectors other than projectors as HUD devices. For example, one or more embodiments of the present invention may be applied to a projector that projects a video from an external apparatus such as a PC or television device.

Furthermore, in one or more embodiments of the first through third examples described above, an example was shown where one or more embodiments of the present invention was applied to the HUD device 100 (200, 300) mounted on a transportation apparatus, but the present invention is not so limited. One or more embodiments of the present invention can also be applied to a HUD device other than a HUD device mounted on a transportation apparatus.

Moreover, in one or more embodiments of the first through third examples described above, an example was given where the light source holding portion 20 and the optical system holding portion 40 (140) are laser welded in two positions (positions corresponding to the two welding fixing portions 22), but the present invention is not so limited. In one or more embodiments of the present invention, the light source holding portion and the optical system holding portion may be laser welded in one or three or more positions.

Furthermore, in one or more embodiments of the first example, the light source holding portion 20 is made of light transmitting resin, and the optical system holding portion 40 is made of light absorbing resin, but the present invention is not so limited. In one or more embodiments of the present invention, the light source holding portion may be made of light absorbing resin, and the optical system holding portion may be made of light transmitting resin. Furthermore, in addition, the light source holding portion and the optical system holding portion may both be made of light transmitting resin, and a light absorbing body may be sandwiched between the light source holding portion and the optical system holding portion.

Furthermore, in one or more embodiments of the first example, the protruding portion 22a of the welding fixing portion 22 of the light source holding portion 20 were provided, so that a gap exists around a laser welding region of the light source holding portion 20 and the optical system holding portion 40, 140. The gap may be between 0 and 100 μm long (excluding 0 μm but including 100 μm). However, the present invention is not so limited. In one or more embodiments of the present invention, the protruding portion may not be provided on the welding fixing portion of the light source holding portion. In this case, the light source holding portion and the glass plate may be sufficiently adhered so that a recessed portion is not formed on the position where the laser light of the laser welding will be irradiated.

Furthermore, the optical system holding portion 40 and the housing 60 are fixed by the screw members 71 in one or more embodiments of the first example described above, the optical system holding portion 140 and the housing 160 are fixed by laser welding in one or more embodiments of the second example described above, and the optical system holding portion 40 and the housing 60 are fixed by a biasing member 290 in one or more embodiments of the third example described above, but the present invention is not so limited. In one or more embodiments of the present invention, the optical system holding portion and the housing may be fixed using methods other such screw member, laser welding, and biasing member. For example, the optical system holding portion and housing may be fixed by an adhesive such as UV cured adhesive.

Moreover, in one or more embodiments of the first example described above, polyphenylene sulfide (PPS) was used as a light transmitting resin and a light absorbing resin, but the present invention is not so limited. In one or more embodiments of the present invention, a resin material other than PPS may be used as a light transmitting resin and a light absorbing resin. For example. An ABS resin or a PP resin may be used as the light transmitting resin and the light absorbing resin. Furthermore, the light transmitting resin and the light absorbing resin may be configured from different resins. The resin material used for the light transmitting resin and the light absorbing resin may be suitably determined based on the usage conditions (for example, condition of heat resistance) of the projector and head up display device where one or more embodiments of the present invention are applied.

REFERENCE NUMERALS 1, 101, 201 Light source unit (or light source portion)
2 Optical scanning portion
10, 10a, 10b, 10c Laser diode (light source)
20 Light source holding portion (or first holder)
22a Protruding portion
30 Collimator lens (optical system) (or optical portion)
40, 140 Optical system holding portion (or second holder)
60, 160 Housing
71 Screw member (fastening member)
100, 200, 300, Head up display device (projector)

What is claimed is:
1. A projector comprising:
a light source portion; and
an optical scanning portion that scans light from the light source portion, wherein
the light source portion comprises a first holder that holds a light source, and a second holder that holds an optical portion through which light from the light source is emitted,
the first holder and the second holder are arranged in that order from a light emitting direction, and
one of the first holder or the second holder is made of light transmitting resin, and the other one is made of light absorbing resin.

2. The projector of claim 1, wherein the first holder and the second holder are fixed by welding.
3. The projector of claim 2, wherein the welding is laser welding.
4. The projector of claim 3, wherein the laser welding is applied to a plurality of positions on the first holder and the second holder.
5. The projector of claim 4, wherein the light source is sandwiched between the plurality of positions when viewed from an optical axis direction.
6. The projector of claim 1, wherein the first holder is made of light transmitting resin, and the second holder is made of light absorbing resin.
7. The projector of claim 1, wherein the light transmitting resin transmits 15% or more laser light of 800 nm to 1100 nm.
8. The projector of claim 5, wherein
the first holder is made of light transmitting resin, and
the first holder comprises a protruding portion on the opposite side of a laser welding surface of the second holder.
9. The projector of claim 8, wherein the protruding portion is a region corresponding to a laser welding region on the laser welding surface of the second holder.
10. The projector of claim 3, wherein a thickness in an optical axis direction of a laser welding region of the first holder is thinner than a thickness of a laser welding region of the second holder.
11. The projector of claim 3, wherein
the light source portion further comprises a housing holding the second holder, and
the second holder and the housing are fastened by a fastening member.
12. The projector of claim 3, wherein the optical scanning portion scans light from the light source portion corresponding to a virtual image that a user views.
13. The projector of claim 10, wherein the thickness in the optical axis direction of the laser welding region of the first holder is 0.2 to 10 mm.
14. The projector of claim 2, wherein a gap exists around a laser welding region of the first holder and the second holder.
15. The projector of claim 14, wherein the gap is 0 to 100 μm.
16. The projector of claim 3, wherein
the light source portion further comprises a housing holding the second holder, and
the second holder and the housing are adhesively bonded by an adhesive.
17. The projector of claim 1, wherein the optical portion comprises a collimator lens.

* * * * *